US010719353B2

(12) United States Patent
Foebel et al.

(10) Patent No.: US 10,719,353 B2
(45) Date of Patent: Jul. 21, 2020

(54) HANDLING FAILOVERS AT ONE OR MORE NODES IN A DISTRIBUTED DATABASE SYSTEM

(71) Applicant: SAP SE, Walldorf (DE)

(72) Inventors: Florian Foebel, Buerstadt (DE); Bjoern Friedmann, Rheinmuenster (DE); Boris Gruschko, Heidelberg (DE); Martin Strenge, Berlin (DE); Christian Mohr, Heidelberg (DE)

(73) Assignee: SAP SE, Walldorf (DE)

( * ) Notice: Subject to any disclaimer, the term of this patent is extended or adjusted under 35 U.S.C. 154(b) by 243 days.

(21) Appl. No.: 15/274,848

(22) Filed: Sep. 23, 2016

(65) Prior Publication Data

US 2018/0088987 A1   Mar. 29, 2018

(51) Int. Cl.
*G06F 9/46* (2006.01)
*G06F 9/48* (2006.01)
*G06F 11/14* (2006.01)
*G06F 16/2455* (2019.01)
*G06F 11/20* (2006.01)

(52) U.S. Cl.
CPC ........ *G06F 9/4881* (2013.01); *G06F 11/1479* (2013.01); *G06F 11/2023* (2013.01); *G06F 16/24553* (2019.01); *G06F 16/24554* (2019.01)

(58) Field of Classification Search
None
See application file for complete search history.

(56) References Cited

U.S. PATENT DOCUMENTS

| | | | | |
|---|---|---|---|---|
| 9,632,828 | B1* | 4/2017 | Mehta | G06F 9/5011 |
| 9,760,529 | B1* | 9/2017 | Ho | G06F 15/177 |
| 2006/0184939 | A1* | 8/2006 | Sahoo | G06F 9/505 |
| | | | | 718/100 |
| 2007/0260723 | A1* | 11/2007 | Cohen | G06F 9/5027 |
| | | | | 709/223 |
| 2011/0188378 | A1* | 8/2011 | Collins | H04L 41/042 |
| | | | | 370/236 |
| 2011/0228668 | A1* | 9/2011 | Pillai | G06F 11/2023 |
| | | | | 370/217 |
| 2014/0331225 | A1* | 11/2014 | Helander | H04L 63/20 |
| | | | | 718/1 |
| 2016/0188628 | A1* | 6/2016 | Hartman | G06F 17/30091 |
| | | | | 707/770 |
| 2017/0147436 | A1* | 5/2017 | Borlick | G11C 29/40 |
| 2018/0081941 | A1* | 3/2018 | Foebel | G06F 9/4881 |

* cited by examiner

*Primary Examiner* — Bradley A Teets
(74) *Attorney, Agent, or Firm* — Mintz Levin Cohn Ferris Glovsky and Popeo, P.C.

(57) ABSTRACT

In one respect, there is provided a distributed database system that includes a first local scheduler node and a second local scheduler node. The first local scheduler node can be configured to coordinate a performance of a first task and a second task by a first worker node associated with the first local scheduler node. The second local scheduler node can be configured to respond to a defect at the first local scheduler node by at least: collecting, from the first worker node, a log indicating one or more tasks completed by the first worker node prior to the defect at the first local scheduler node; determining, based at least on the log, that the first worker node has completed the first task but not the second task; and coordinating a performance of the second task by the first worker node. Related methods and articles of manufacture are also provided.

13 Claims, 8 Drawing Sheets

US 10,719,353 B2

HANDLING FAILOVERS AT ONE OR MORE NODES IN A DISTRIBUTED DATABASE SYSTEM

FIELD

The present disclosure generally relates to database processing and, more specifically, to the handling of failovers in a distributed database system.

BACKGROUND

Data in a distributed database system is stored across a multitude of physically and/or logically distinct nodes. For example, data in a distributed database system may be stored on different computers. Alternately or additionally, data in a distributed database system may be managed by separate processes. As such, a query on data stored in a distributed database is typically executed in sequential phases. For instance, an initial phase for executing the query can include generating, at a global scheduler node, an execution plan for fulfilling the query. Fragments of the execution plan can be distributed to one or more local scheduler nodes that further assign the tasks specified in the plan fragments to the appropriate worker nodes. Meanwhile, during a subsequent phase, one or more worker nodes may perform the tasks assigned to each worker node. In both instances, the nodes (e.g., scheduler and worker nodes) that are involved in the execution of the query can exchange messages (e.g., control messages) in order to coordinate the execution of the query pursuant to the execution plan.

SUMMARY

Methods, systems, and articles of manufacture, including computer program products, are provided for failover handling in a distributed database system. In some implementations of the current subject matter, there is provided a distributed database system. The distributed database system can include a first local scheduler node and a second local scheduler node. The first local scheduler node can be configured to coordinate a performance of a first task and a second task by at least a first worker node associated with the first local scheduler node. The second local scheduler node can be configured to respond to a defect at the first local scheduler node by at least: collecting, from the first worker node, a log indicating one or more tasks completed by the first worker node prior to the defect at the first local scheduler node; determining, based at least on the log, that the first worker node has completed the first task but not the second task; and coordinating a performance of the second task by the first worker node.

In some variations, one or more of the features disclosed herein including the following features can optionally be included in any feasible combination. The log can further indicate that the first worker node is in the process of completing the second task. The distributed databased system can further include a global scheduler node configured to: receive a query on data stored at and/or managed by at least the first worker node and a second worker node associated with a third local scheduler node; generate an execution plan for the query; partition the execution plan into a first fragment and a second fragment; and delegate the first fragment of the execution plan to the first local scheduler node and the second fragment of the execution plan to the third local scheduler node. The first fragment of the execution plan can include the first task and the second task.

The second local scheduler node can be configured to send a notification to at least the third local scheduler node, when at least the first worker node completes the first fragment of the execution plan. The third local scheduler node can receive the notification from the second local scheduler node before the third local scheduler node receives the second fragment of the execution plan from the global scheduler node.

In some variations, the first worker node can be configured to update the log, when the first worker node completes the first task and reports the completion of the first task to the first local scheduler node. The second local scheduler node can be configured to respond to a defect at the first worker node by at least assigning, to a second worker node, the first task and the second task. The second worker node can be configured to perform both the first task and the second task. The performing of both of the first task and the second task can re-execute at least one of the first task and the second task, and wherein the re-executing rebuilds intermediate data that is lost due to the defect at the first worker node.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

Figure 1:
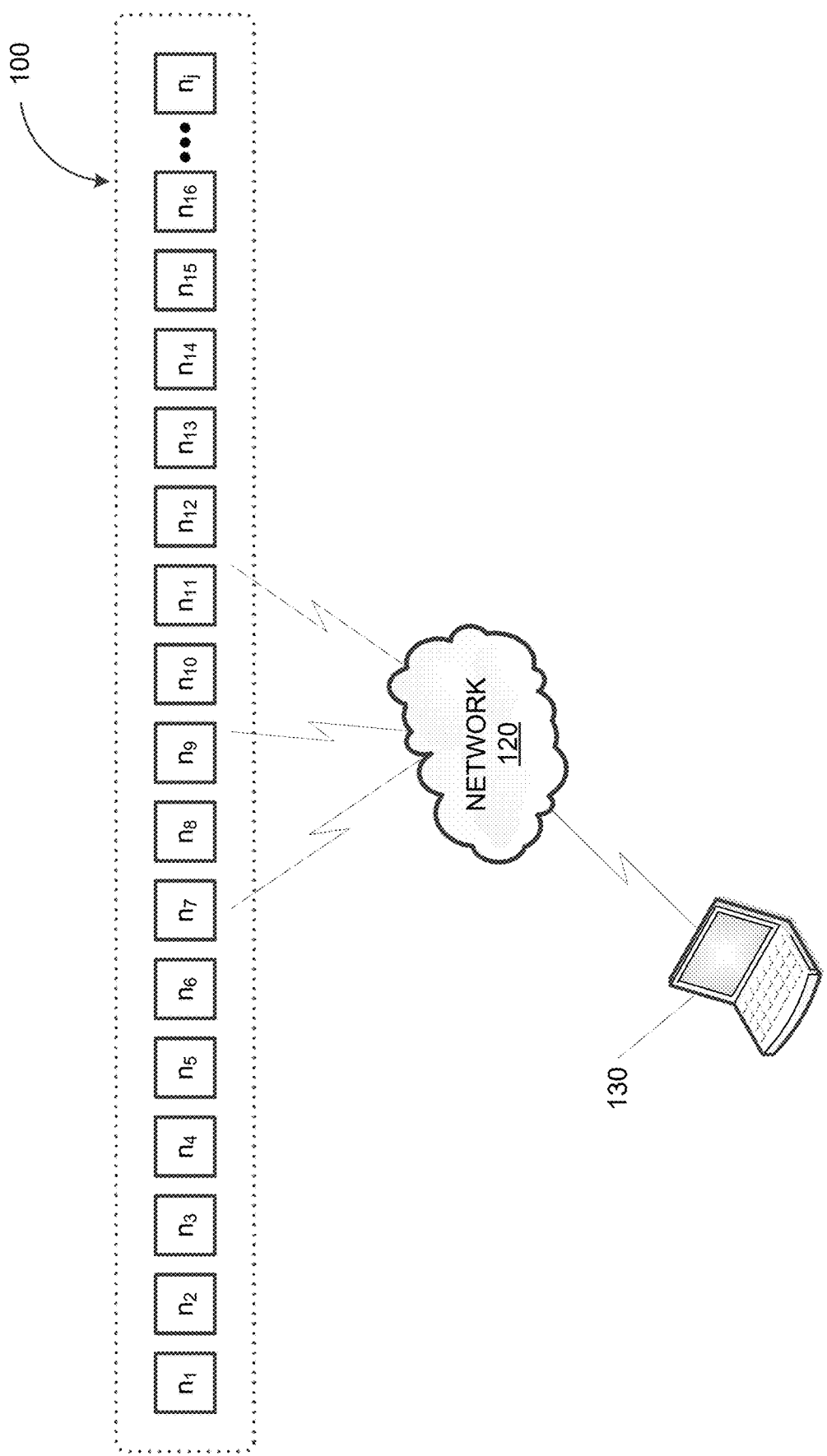
FIG. 1 depicts a network diagram illustrating a distributed database system consistent with implementations of the current subject matter.

Like labels are used to refer to same or similar items in the drawings.

DETAILED DESCRIPTION

As noted above, a query on data stored in a distributed database is typically executed in sequential phases. But queries executed in this manner are generally aborted when a defect (e.g., a process and/or hardware failure) occurs at any scheduler or worker node involved in the execution of the query. Defects that occur during a later phase in the execution of a lengthy query tend to be especially costly because the aborted query must be re-executed in its entirety.

In some implementations of the current subject matter, a distributed database system can include at least one global scheduler node that is configured to generate an execution plan for a query and distribute fragments of the execution plan to one or more local scheduler nodes. Meanwhile, a local scheduler node is configured to coordinate the operations of one or more worker nodes associated with the local scheduler node. For instance, the local scheduler node can track the execution state of a fragment of an execution plan that is delegated to the local scheduler node. The fragment of the execution plan can specify one or more tasks to be performed by the worker nodes associated with the local scheduler node. Thus, tracking the execution state of the fragment of the execution plan can include determining when various worker nodes have completed the tasks specified in the fragment of the execution plan.

In some implementations of the current subject matter, a local scheduler node can further report, to one or more other local scheduler nodes, the execution state of the fragment of the execution plan. For example, the fragment of the execution plan delegated to a local scheduler node can require the local scheduler node to report the execution state to one or more other local scheduler nodes. Thus, the local scheduler node can send notifications to one or more other local scheduler nodes, when the worker nodes associated with the local scheduler node have completed the tasks specified in the execution plan or fragment of the execution plan.

According to some implementations of the current subject matter, the distribution of fragments of the execution plan and the reporting of the execution state of the fragments of the execution plan can occur asynchronously. That is, a local scheduler node can receive, from another local scheduler node, a notification that the worker nodes assigned to the other scheduler node have completed the tasks specified in the fragment of the execution plan delegated to the other local scheduler node. The local scheduler node can receive the notification from the other local scheduler before the local scheduler receives its fragment from the same execution plan.

In some implementations of the current subject matter, the distributed database system can further include one or more worker nodes that are configured to track the tasks that are being performed by and/or are completed by each worker node. For instance, a worker node can be assigned tasks from fragments of different execution plans and the worker node can maintain corresponding logs indicating the tasks from different execution plans that the worker node has completed and/or are in the process of completing. When the worker node completes a task specified in a fragment of a particular execution plan, the worker node can notify a local scheduler node of the completion of the task. The worker node can further update a corresponding log with an indication that the task has been completed and reported to the local scheduler node.

According to some implementations of the current subject matter, in the event of a defect (e.g., process failure, hardware failure) at the local scheduler node, the execution state of the fragments of the different execution plans delegated to the defective local scheduler node can be reconstructed based on the logs maintained by the worker nodes associated with the defective local scheduler node. Specifically, failover handling for a defective local scheduler node can include collecting, from the worker nodes associated with the defective local scheduler node, the logs indicating the tasks that the worker nodes have completed and/or are in the process of completing. A replacement local scheduler node can determine, based on the logs, the execution state of the fragments of the execution plans that were delegated to the defective local scheduler node. The execution state of a fragment of an execution plan can indicate the tasks that have been completed as well as the tasks that are in the process of being completed. Accordingly, the replacement local scheduler node can coordinate the execution of the remaining uncompleted tasks from the fragments of the different execution plans based on the respective execution states of the fragments of the different execution plans. In this manner, the execution of the different plan fragments can continue without the worker nodes having to re-execute the tasks that have already been completed prior to the defect. Moreover, tracking the execution state prevents the replacement local scheduler node from inadvertently reassigning tasks that are already in the process of being performed by worker to another worker node.

In some implementations of the current subject matter, failover handling for a defective worker node can include executing, by a replacement worker node, tasks that are assigned to the defective worker node. For example, in response to a defect (e.g., process failure, hardware failure) at a worker node, the local scheduler node associated with the defective worker node can reassign, to the replacement worker node, the tasks (e.g., from a fragment of an execution plan) that were assigned to the defective worker node. One or more of the tasks that were assigned to the defective worker node may be re-executed by the replacement worker node in order to rebuild intermediate data relating to the performance of the tasks, which was lost due to the defective worker node.

FIG. 1 depicts a network diagram illustrating a distributed database system 100 consistent with implementations of the current subject matter. Referring to FIG. 1, the distributed database system 100 can include a j number of nodes (e.g., $n_1$ through $n_j$). The nodes $n_1$ through $n_j$ can be communicatively coupled via a wired and/or wireless network 120. Furthermore, a client 130 can also communicate with the distributed database system 100 via the wired and/or wireless network 120. The wired and/or wireless network 120 can be a wide area network (WAN), a local area network (LAN), and/or the Internet. The distributed database system 100 can include any number of nodes without departing from the scope of the present disclosure.

The client 130 can submit a query to the distributed database system 100. Data in the distributed database system 100 can be stored at and/or managed by several different nodes (e.g., two or more of the nodes $n_1$ through $n_j$). For instance, the query from the client 130 may be a request to retrieve data (e.g., SELECT) from a database table that is stored in and/or managed by two or more of the nodes $n_1$ through $n_j$. As such, executing the query from the client 130 can require a coordination of operations performed by two or more of the nodes $n_1$ through $n_j$.

In some implementations of the current subject matter, the nodes $n_1$ through $n_j$ can form a hierarchy in which each node can be designated to serve as a global scheduler node, a local scheduler node, or a worker node. A global scheduler node can be configured to generate an execution plan for the query (e.g., from the client 130) and distribute fragments of the execution plan to one or more local scheduler nodes. Meanwhile, a local scheduler node can receive a plan fragment from the global scheduler node and coordinate the execution of the plan fragment by the worker nodes associated with the local scheduler node. It should be appreciated that the global scheduler nodes, local scheduler nodes, and worker nodes can form a static hierarchy or dynamic hierarchy without departing from the scope of the present disclosure.

Figure 2:
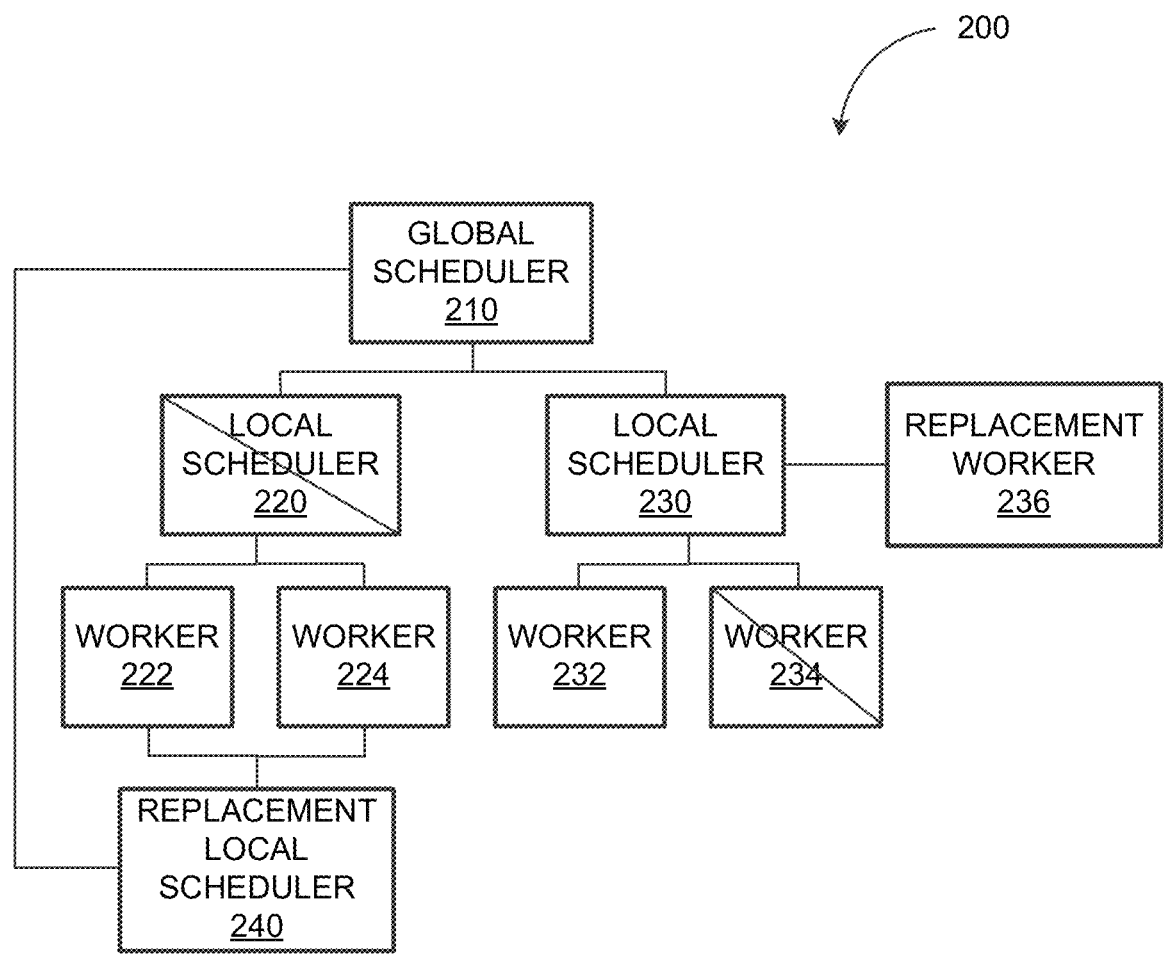
FIG. 2 depicts a hierarchy consistent with implementations of the current subject matter.

FIG. 2 depicts a hierarchy 200 consistent with implementations of the current subject matter. Referring to FIGS. 1-2, the nodes $n_1$ through $n_j$ of the distributed database system 100 can form the hierarchy 200.

As shown in FIG. 2, the hierarchy 200 can include a global scheduler node 210, a first local scheduler node 220, and a second local scheduler node 230. The hierarchy 200 can further include a plurality of worker nodes including, for example, a first worker node 222, a second worker node 224, a third worker node 232, and a fourth worker node 234.

According to implementations of the current subject matter, the global scheduler node 210 can be configured to respond to queries on data that is stored at and/or managed by one or more of the first worker node 222, the second worker node 224, the third worker node 232, and the fourth worker node 234. For instance, the global scheduler node 210 can generate an execution plan for a query on data that is stored at and/or managed by any of the first worker node 222, the second worker node 224, the third worker node 232, and/or the fourth worker node 234. The global scheduler node 210 can further distribute and delegate fragments of the execution plan to the appropriate local scheduler nodes (e.g., the first local scheduler node 220 and/or the second local scheduler node 230). Each fragment of the execution plan can specify one or more tasks to be performed by the worker nodes assigned to a certain local scheduler node.

As shown in FIG. 2, the first worker node 222 and the second worker node 224 can be associated with the first local scheduler node 220. As such, the first local scheduler node 220 can coordinate the performance of tasks (e.g., specified by fragments of execution plans delegated to the first local scheduler nodes 220) by the first worker node 222 and/or the second worker node 224. Meanwhile, the third worker node 232 and the fourth worker node 234 can be associated with the second scheduler node 230. The second scheduler node 230 can coordinate the performance of tasks (e.g., specified by fragments of execution plans delegated to the second local scheduler node 230) by the third worker node 232 and/or the fourth worker node 234.

For example, for a query on data stored at and/or managed by the first worker node 222 and the second worker node 224, the global scheduler node 210 may distribute at least a fragment of the execution plan to the first local scheduler node 220. By contrast, for a query on data stored at and/or managed by the first worker node 222 and the third worker node 232, the global scheduler node 210 may distribute one plan fragment to the first local scheduler node 220 and another plan fragment to the second local scheduler node 230.

According to implementations of the current subject matter, the first worker node 222 and the second worker node 224 can be configured to maintain one or more logs indicating the tasks that each worker node has completed and/or are in the process of completing. The logs maintained by the worker nodes may correspond to the fragments of different execution plans that have been delegated to the first local scheduler node 220. For example, the first worker node 222 can be assigned, by the first local scheduler node 220, one or more tasks from a fragment of the execution plan generated by the global scheduler node 210. The first worker node 222 can maintain a corresponding log, which is updated each time the first worker node 222 completes a task from the fragment of the execution plan and reports the completion of the task to the first local scheduler node 220. Alternately or additionally, the second worker node 224 can maintain a log that is updated whenever the second worker node 224 completes a task from the fragment of the execution plan that is assigned to the second worker node 224 and reports the completion of the task to the first local scheduler node 220.

In the event of a defect (e.g., process failure, hardware failure) at the first local scheduler node 220, failover handling includes selecting a replacement local scheduler node 240 to replace the first local scheduler node 220. In an example consistent with implementations of the current subject matter, the replacement local scheduler node 240 can be configured to collect the logs maintained by the first worker node 222 and/or the second worker node 224. The logs from the first worker node 222 and/or the second worker node 224 can indicate the tasks (e.g., from fragments of different execution plans delegated to the first local scheduler node 220) that have already been completed by the first worker node 222 and/or the second worker node 224. Alternately or additionally, the logs from the first worker node 222 and/or the second worker node 224 can indicate tasks (e.g. from fragments of different execution plans delegated to the first local scheduler node 220) that the first worker node 222 and/or the second worker node 224 are in the process of completing. Thus, the replacement local scheduler node 240 can determine, based on the logs, which tasks remains to be performed by the first local worker node 222 and/or the second worker node 224. The replacement local scheduler node 240 can coordinate the execution of the remaining tasks from the plan fragments. In this manner, the defect at the first local scheduler node 220 does not cause any query to be aborted and re-executed in its entirety.

In some implementations of the current subject matter, failover handing for a defect (e.g., process failure, hardware failure) at a worker node can include reassigning, to a replacement worker node, the tasks that were assigned to the defective worker node. For example, in the event of a defect at the fourth worker node 234, the second local scheduler node 230 can re-assign, to a replacement worker node 236, the tasks that were assigned to the fourth worker node 234. The fourth worker node 234 may have already completed and/or are in the process of completing one or more of the tasks. However, intermediate data relating to the performance of the one or more tasks may be lost and not recoverable due to the defect at the fourth worker node 234. Thus, all the tasks that were assigned to the fourth worker node 234 may be reassigned to the replacement worker node 236, including the tasks that the fourth worker node 234 have already completed and/or are in the process of completing prior to the defect. In doing so, the replacement worker node 236 may re-execute the tasks already completed by the fourth worker node 234 as well as tasks that the fourth worker node 234 are in the process of completing, thereby rebuilding the intermediate data that was lost due to the defect at the fourth worker node 234.

It should be appreciated that the hierarchy 200 may be a static hierarchy or a dynamic hierarchy without departing from the scope of the present disclosure. In a static hierarchy, the connections shown in FIG. 2 can be fixed. That is, communications between the scheduler and worker nodes in the hierarchy 200 to fulfill different queries may use the same established connections. By contrast, the connections in a dynamic hierarchy can change depending on the query. Thus, if the scheduler nodes and worker nodes in the hierarchy 200 are adapted to form a dynamic hierarchy, different connections may be established between the scheduler and/or worker nodes in order to fulfill different queries.

Figure 3:
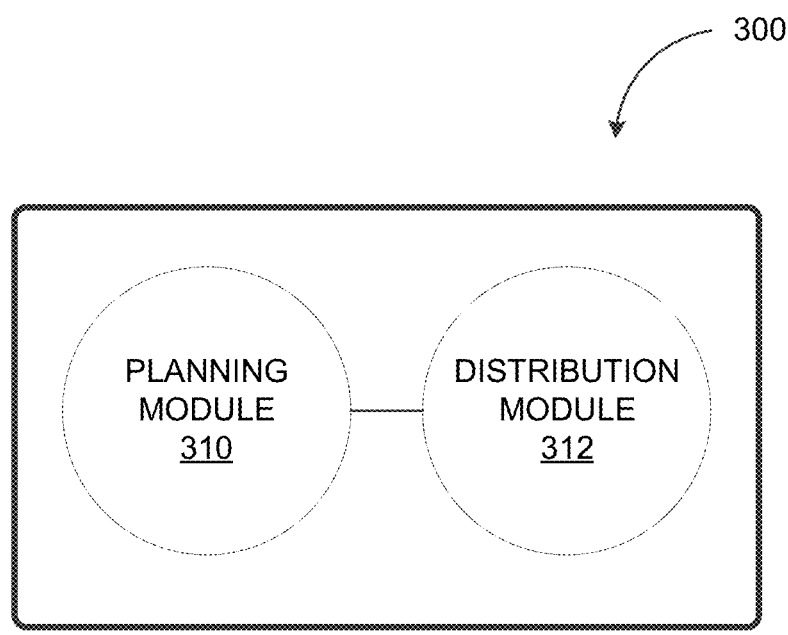
FIG. 3 depicts a block diagram illustrating a global scheduler node consistent with implementations of the current subject matter.

FIG. 3 depicts a block diagram illustrating a global scheduler node 300 consistent with implementations of the current subject matter. Referring to FIGS. 1-3, the global scheduler node 300 can include the functionalities of the global scheduler node 210.

As shown in FIG. 3, the global scheduler node 300 can include a programmable processor and/or computer hardware configured to implement a planning module 310 and a distribution module 312. Alternately or additionally, the global scheduler node 300 (e.g., the planning module 310, the distribution module 312) can be a virtual node implemented on one or more programmable processors.

In some implementations of the current subject matter, the planning module 310 can be configured to generate an execution plan for a query on data that is stored at and/or managed by multiple worker nodes. Thus, the execution plan for a query can include a plurality of tasks, which are to be performed by one or more worker nodes in a distributed database system. For example, the planning module 310 may generate an execution plan that includes tasks to be performed by the first worker node 222, the second worker node 224, the third worker node 232, and/or the fourth worker node 234.

According to some implementations of the current subject matter, worker nodes are associated with different local scheduler nodes to form a hierarchy (e.g., the hierarchy 200). As such, the planning module 310 can be further configured to partition the execution plan into a plurality of fragments based on the association between worker nodes and local scheduler nodes. The distribution module 312 can be configured to distribute the fragments of the execution plan to the appropriate local scheduler nodes. Distributing a fragment of the execution plan to a local scheduler node delegates the plan fragment to that local scheduler node such that the local scheduler node can coordinate the performance of the tasks in the plan fragment by the worker nodes associated with the local scheduler node.

Figure 4:
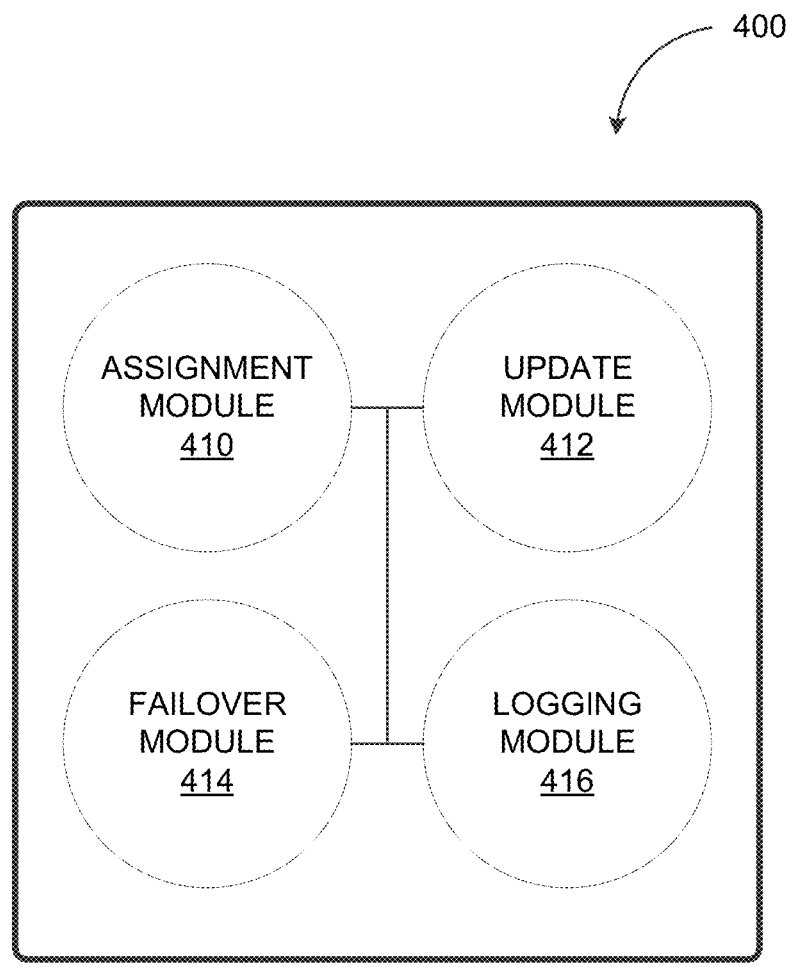
FIG. 4 depicts a block diagram illustrating a local scheduler node consistent with implementations of the current subject matter.

FIG. 4 depicts a block diagram illustrating a local scheduler node 400 consistent with implementations of the current subject matter. Referring to FIGS. 1-2 and 4, the local scheduler node 400 can include the functionalities of the first local scheduler node 220, the second local scheduler node 230, and/or the replacement local scheduler node 240.

As shown in FIG. 4, the local scheduler node 400 can include a programmable processor and/or computer hardware configured to implement an assignment module 410, an update module 412, a failover module 414, and a logging module 416. Alternately or additionally, the local scheduler node 400 (e.g., the assignment module 410, the update module 412, and the failover node 414) can be a virtual node implemented on one or more programmable processors.

In some implementations of the current subject matter, the assignment module 410 can be configured to distribute tasks specified in a fragment of an execution plan to one or more worker nodes. For instance, the local scheduler node 400 may receive, from a global scheduler node, a fragment of an execution plan. The fragment of the execution plan may be delegated to the local scheduler node 400 such that the local scheduler node 400 can coordinate the performance of the tasks specified in the plan fragment by the worker nodes associated with the local scheduler node 400. As such, the assignment module 410 can distribute the tasks from the fragment of the execution plan to the worker nodes that are associated with the local scheduler node 400. For example, the assignment module 410 of the first local scheduler node 220 can be configured to distribute, to the first worker node 222 and/or the second worker node 224, the tasks specified in a fragment of an execution plan delegated to the first local scheduler node 220 by the global scheduler node 210.

The update module 412 can be configured to report on the execution state of the fragments of different execution plans delegated to the local scheduler node 400. For instance, the update module 412 may send notifications to one or more other local scheduler nodes indicative of when the worker nodes associated with the local scheduler node 400 has completed the tasks specified in the fragment of the execution plan delegated to the local scheduler node. For example, the update module 412 of the first local scheduler node 220 can be configured to send, to the second local scheduler node 230, notifications of when the first worker node 222 and/or the second worker node 224 completes the operations specified in a fragment of an execution plan.

In some implementations of the current subject matter, the logging module 416 can be configured to maintain a log tracking the execution state of the tasks assigned to the worker nodes associated with the local scheduler node 400. For instance, the logging module 416 can update a corresponding log whenever the local scheduler node 400 receives, from a worker node associated with the local scheduler node 400, a status update indicating a completion of the tasks assigned to that worker node. In addition, the local scheduler node 400 can provide, to one or more other local scheduler nodes, status updates on the tasks assigned to the worker nodes associated with the local scheduler 400. Thus, the logs maintained by the logging module 416 can indicate the status updates that have been provided by the local scheduler node 400 to one or more other local scheduler nodes.

For example, the logging module 416 of the second local scheduler node 230 can maintain one or more logs tracking the execution state of the tasks assigned to the third worker node 232 and the fourth worker node 234. The logging module 416 can update the logs whenever the third worker node 232 and/or the fourth worker node 234 complete an assigned task. In some implementations of the current subject matter, the second local scheduler node 230 can provide, to the first local scheduler node 220, status updates on the tasks assigned to the third worker node 232 and the fourth worker node 234. Thus, in the event of a defect at the first local scheduler node 220, the logging module 416 of the second local scheduler node 230 can provide, to the replacement local scheduler node 240, logs indicating the status updates that the second local scheduler node 230 sent to the first local scheduler node 220 prior to the defect at the first local scheduler node 220. The replacement local scheduler node 240 can continue to coordinate, based at least on the logs from the second local scheduler node 230, the performance of the tasks assigned to the first local scheduler node 220.

According to some implementations of the current subject matter, the distribution of the fragments of the execution plan and the reporting of execution states can occur asynchronously. Thus, the update module 412 of the first local scheduler node 220 can report, to the second local scheduler node 230, the execution state of a fragment of an execution plan delegated to the first local scheduler node 220 even if the second local scheduler node 230 not yet received its respective plan fragment from the global scheduler node 210.

In some implementations of the current subject matter, the local scheduler node 400 can act as a replacement local scheduler node in response to a defect (e.g., process failure, hardware failure) at another local scheduler node. The failover module 414 can be configured to collect, from the worker nodes associated with the defective local scheduler node, logs that indicate the tasks that have been and/or are in the process of being completed by the worker nodes. The failover module 414 can be further configured to determine, based on the logs, the execution state of the fragments of various execution plans that was delegated to the defective local scheduler node. In this manner, the failover module 414 can coordinate the execution of the remaining tasks from the fragments of the execution plans by the worker nodes associated with the defective local scheduler node. For example, the replacement local scheduler node 240 can continue to coordinate the operations of the first worker node 222 and the second worker node 224 in the event of a defect at the first local scheduler node 220. Thus, the failover module 414 of the replacement local scheduler node 240 can be configured to collect, from the first worker node 222 and/or the second worker node 224, logs indicating the tasks completed by and/or are in the process of being completed by the first worker node 222 and/or the second worker node 224.

Figure 5:
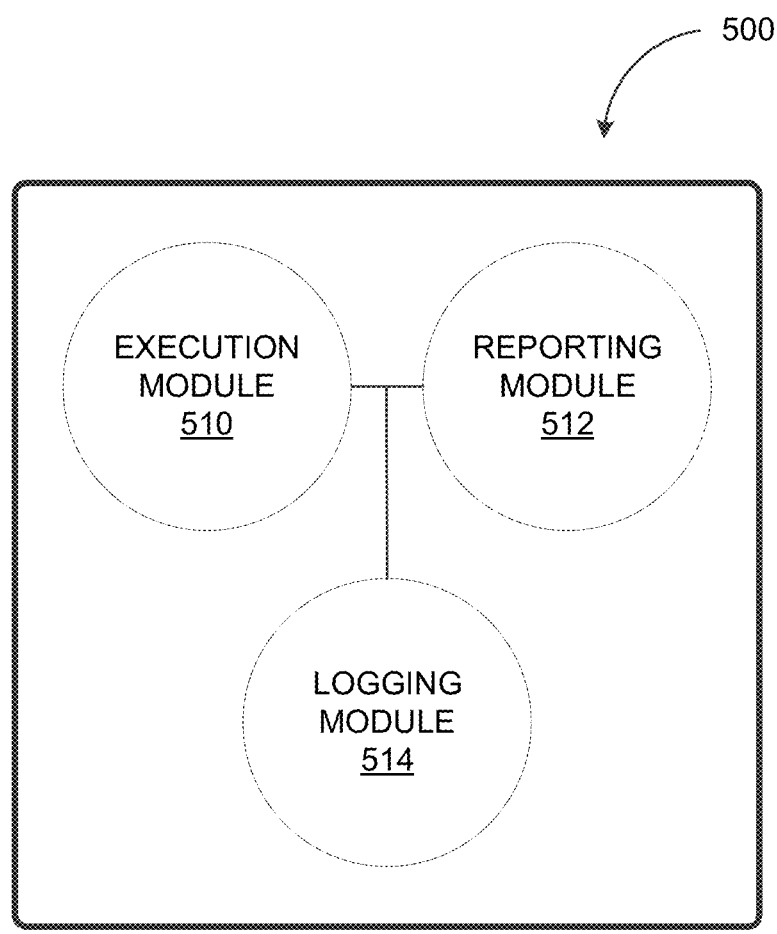
FIG. 5 depicts a block diagram illustrating a worker node consistent with implementations of the current subject matter.

FIG. 5 depicts a block diagram illustrating a worker node 500 consistent with implementations of the current subject matter. Referring to FIGS. 1-2 and 5, the worker node 500 can include the functionalities of the first worker node 222, the second worker node 224, the third worker node 232, and/or the fourth worker node 234.

As shown in FIG. 5, the worker node 500 can include a programmable processor and/or computer hardware configured to implement an execution module 510, a reporting module 512, and a logging module 514. Alternately or additionally, the worker node 400 (e.g., the execution module 510, the reporting module 512, and the logging module 414) can be a virtual node implemented on one or more programmable processors.

In some implementations of the current subject matter, the execution module 510 can be configured to perform, as specified by an execution plan, one or more tasks on data stored at and/or managed by the worker node 500. For instance, the execution module 510 of the first worker node 222 can be configured to complete the tasks assigned to the first worker node 222 by the first local scheduler node 220.

The reporting module 512 can be configured to provide updates associated with the performance of the tasks assigned to the worker node 500. For instance, the reporting module 512 of the first worker node 222 can be configured to provide updates to the first local scheduler node 220 associated with the first worker node 222. According to implementations of the current subject matter, the update module 512 of the first worker node 222 can be configured to report, to the first local scheduler node 220, when the execution module 510 of the first worker node 222 completes a task assigned to the first worker node 222.

In some implementations of the current subject matter, the logging module 514 can be configured to maintain a log for each fragment of an execution plan that includes tasks to be performed by the worker node 500. The logging module 514 can be further configured to update a corresponding log whenever the execution module 510 completes a task assigned to the worker node 500 and reports the completion of the task to the local scheduler node associated with the worker node 500. According to some implementations of the current subject matter, the logging module 514 can provide the logs to a replacement local scheduler node when a defect (e.g., process failure, hardware failure) occurs at the local scheduler node that is originally associated with the worker node 500.

For example, the logging module 514 of the first worker node 222 can be configured to maintain one or more logs of the tasks that the first worker node 222 has completed and/or are in the process of completing. In the event of a defect at the first local scheduler node 220, the logging module 514 of the first worker node 222 can be configured to provide, to the replacement local scheduler node 240, the logs indicating the tasks that have been completed and/or are in the process of being completed by the first worker node 222. The logs enables the replacement local scheduler node 240 to determine the execution state of the fragments of different execution plans that were delegated to the first local scheduler node 220 (e.g., by the global scheduler node 210). That is, the replacement local scheduler node 240 can determine, based on the logs, which tasks have been completed by the first worker node 222 prior to the defect at the first local scheduler node 220. The replacement local scheduler node 240 can further determine, based on the logs, which tasks are in the process of being completed by the first worker node 222 prior to the defect at the first local scheduler node 220. As such, the replacement local scheduler node 240 is able to coordinate the performance of the tasks that have not been completed by the first worker node 222 prior to the defect at the first local scheduler node 220.

Figure 6:
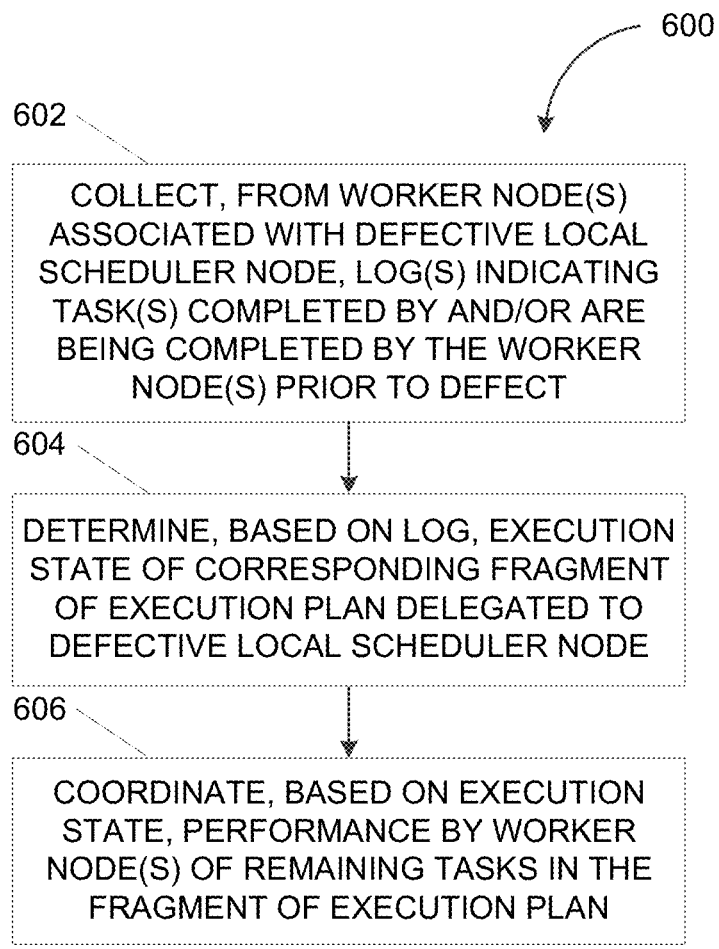
FIG. 6 depicts a flowchart illustrating a process for handling a failover at a scheduler node consistent with implementations of the current subject matter.

FIG. 6 depicts a flowchart illustrating a process 600 for handling a failover at a scheduler node consistent with implementations of the current subject matter. Referring to FIGS. 1-6, the process 600 can be performed by a local scheduler node (e.g., replacement local scheduler node 240) that is replacing a defective local scheduler node (e.g., the first local scheduler node 220) in a distributed database system (e.g., the distributed database system 100).

The local scheduler node can collect, from one or more worker nodes associated with the defective local scheduler node, at least one log indicating the one or more tasks completed by and/or are in the process of being completed by the worker nodes prior to the defect (602). For example, in the event of a defect at the first local scheduler node 220, the replacement local scheduler node 240 can collect, from the first worker node 222 and/or the second worker node 224, logs indicating the tasks from one or more plan fragments that the first worker node 222 and/or the second worker node 224 have already completed prior to the defect at the first local scheduler node 220. The logs can further indicate tasks from the one or more plan fragments that are in the process of being completed by the first worker node 222 and/or the second worker node 224 prior to the defect at the first local scheduler node 220.

The local scheduler node can determine, based at least on the log, an execution state of a corresponding fragment of an execution plan that was delegated to the defective local scheduler node (604). For instance, the replacement local scheduler node 240 can determine, based on the logs from the first worker node 222 and/or the second worker node 224, the tasks that the first worker node 222 and/or the second worker node 224 have already completed prior to the defect at the first local scheduler node 220. Alternately or additionally, the replacement local scheduler node 240 can determine, based on the logs, the tasks that are in the process of being completed but have yet to be completed by the first worker node 222 and/or the second worker node 224.

The local scheduler node can coordinate, based on the execution state, a performance of the remaining tasks in the fragment of the execution plan by the worker nodes (606).

For instance, the logs maintained by the first worker node 222 and/or the second worker node 224 indicate the tasks that have already been completed by the first worker node 222 and/or the second worker node 224. The replacement local scheduler node 240 is further able to determine, based on the logs, the tasks that remain to be completed by the first worker node 222 and/or the second worker node 224. According to implementations of the current subject matter, the replacement local scheduler node 240 can coordinate the performance of the remaining uncompleted tasks by the first worker node 222 and/or the second worker node 224.

Figure 7:
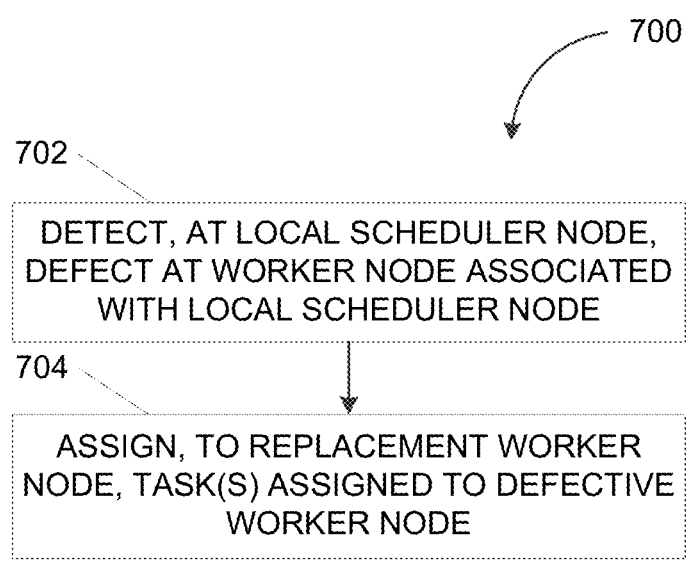
FIG. 7 depicts a flowchart illustrating a process for handling a failover at a worker node consistent with implementations of the current subject matter.

FIG. 7 depicts a flowchart illustrating a process 700 for handling a failover at a worker node consistent with implementations of the current subject matter. Referring to FIGS. 1-5 and 7, the process 700 can be performed by a local scheduler node (e.g., the first local scheduler node 220, the second local scheduler node 230) in response to a defect at a worker node associated with the local scheduler node (e.g., the first worker node 222 and/or the second worker node 224, the third worker node 232 and/or the fourth worker node 234).

The local scheduler node can detect a defect at a worker node associated with the local scheduler node (702). For example, the second local scheduler node 230 may detect, at the fourth worker node 234, a defect including, for example, a process failure and/or a hardware failure.

The local scheduler node can assign, to a replacement worker node, the tasks that were assigned to the defective worker node (704). For example, the second local scheduler node 230 may assign, to the replacement worker node 236, the tasks that were originally assigned to the fourth worker node 234. The replacement worker node 236 may re-execute one or more tasks that have already been completed by the fourth worker node 234 prior to the defect. The re-execution of the tasks enables the replacement worker node 236 to rebuild the intermediate data that was lost due to the defect at the fourth worker node 234.

Figure 8:
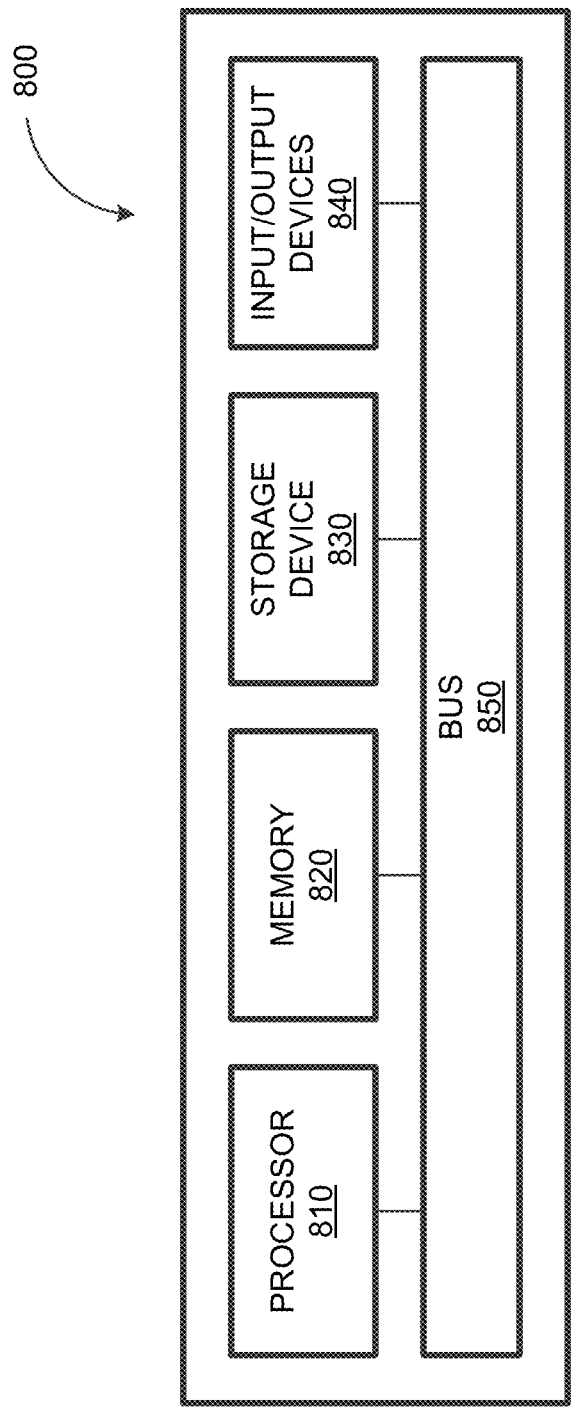
FIG. 8 depicts a block diagram illustrating a computing system consistent with implementations of the current subject matter.

FIG. 8 depicts a block diagram illustrating a computing system 800 consistent with implementations of the current subject matter. Referring to FIGS. 1-8, the computing system 800 can be used to implement the global scheduler node 300, the local scheduler node 400, and/or the worker node 500.

As shown in FIG. 8, the computing system 800 can include a processor 810, a memory 820, a storage device 830, and input/output devices 840. The processor 810, the memory 820, the storage device 830, and the input/output devices 840 can be interconnected via a system bus 850. The processor 810 is capable of processing instructions for execution within the computing system 800. Such executed instructions can implement one or more components of, for example, the global scheduler node 300, the local scheduler node 400, and/or the worker node 500. In some implementations of the current subject matter, the processor 810 can be a single-threaded processor. Alternately, the processor 810 can be a multi-threaded processor. The processor 810 is capable of processing instructions stored in the memory 820 and/or on the storage device 830 to display graphical information for a user interface provided via the input/output device 840.

The memory 820 is a computer readable medium such as volatile or non-volatile that stores information within the computing system 800. The memory 820 can store data structures representing configuration object databases, for example. The storage device 830 is capable of providing persistent storage for the computing system 800. The storage device 830 can be a floppy disk device, a hard disk device, an optical disk device, or a tape device, or other suitable persistent storage means. The input/output device 840 provides input/output operations for the computing system 800. In some implementations of the current subject matter, the input/output device 840 includes a keyboard and/or pointing device. In various implementations, the input/output device 840 includes a display unit for displaying graphical user interfaces.

According to some implementations of the current subject matter, the input/output device 840 can provide input/output operations for a network device. For example, the input/output device 840 can include Ethernet ports or other networking ports to communicate with one or more wired and/or wireless networks (e.g., a local area network (LAN), a wide area network (WAN), the Internet).

In some implementations of the current subject matter, the computing system 800 can be used to execute various interactive computer software applications that can be used for organization, analysis and/or storage of data in various (e.g., tabular) format (e.g., Microsoft Excel®, and/or any other type of software). Alternatively, the computing system 800 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities (e.g., SAP Integrated Business Planning add-in for Microsoft Excel as part of the SAP Business Suite, as provided by SAP SE, Walldorf, Germany) or can be standalone computing products and/or functionalities. Upon activation within the applications, the functionalities can be used to generate the user interface provided via the input/output device 840. The user interface can be generated and presented to a user by the computing system 800 (e.g., on a computer screen monitor, etc.).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A distributed database system, comprising:
a first local scheduler node implemented on one or more programmable processors and configured to perform operations comprising:
receiving, from a global scheduler node, a first fragment of an execution plan for a query, the execution plan being partitioned into the first fragment and a second fragment, the second fragment being sent to a second local scheduler node for execution the first fragment of the execution plan including a first task and a second task, and the first local scheduler node executing the first fragment of the execution plan by at least tracking an execution state of the first task and the second task being performed by a first worker node associated with the first local scheduler node; and
responding to a first defect at the first worker node by at least assigning, to a second worker node associated with the first local scheduler node, the first task and the second task, the second worker node responding to the assigning by at least re-executing at least one of the first task and the second task in order to rebuild intermediate data that is lost due to the first defect at the first worker node; and
a third local scheduler node implemented on one or more programmable processors and configured to perform operations comprising responding to a second defect at the first local scheduler node by at least:
collecting, from at least one the first worker node and the second worker node, a log indicating one or more tasks completed by the at least one the first worker node and the second worker node prior to the second defect at the first local scheduler node;
determining, based at least on the log, that the at least one the first worker node and the second worker node have completed the first task but not the second task;
continuing the executing of the first fragment of the execution plan by at least tracking the execution state of the second task being performed by the at least one of the first worker node and the second worker node; and
sending, to the second local scheduler node, a notification indicating a completion of the first fragment of the execution plan without the second local scheduler node having received the second fragment of the execution plan from the global scheduler node.

2. The distributed database system of claim 1, wherein the log further indicates that the at least one of the first worker node and the second worker node are in the process of completing the second task, and wherein the indication prevents the third local scheduler node from reassigning the second task to a third worker node.

3. The distributed database system of claim 1, further comprising the global scheduler node, the global scheduler node being implemented on one or more programmable processors and configured to perform operations comprising:
receiving the query, the query requiring data stored at the first worker node associated with the first local scheduler node and a third worker node associated with the second local scheduler node;
generating the execution plan for the query;
partitioning the execution plan into the first fragment and the second fragment; and
delegating the first fragment of the execution plan to the first local scheduler node and the second fragment of the execution plan to the second local scheduler node.

4. The distributed database system of claim 3, further comprising:
the second local scheduler node, the second local scheduler node being implemented on one or more programmable processors and configured to receive, from the third local scheduler node, the notification prior to receiving, from the global scheduler node, the second fragment of the execution plan.

5. The distributed database system of claim 1, wherein the third local scheduler node is configured to send, to the second local scheduler node, the notification in response to the at least one of the first worker node and the second worker node having completed executing the first fragment of the execution plan.

6. The distributed database system of claim 1, wherein the at least one of the first worker node and the second worker node are configured to update the log upon completing the first task, and wherein the at least one of the first worker node and the second worker node are further configured to report, to at least one of the first local scheduler node and the third local scheduler node, the completion of the first task.

7. A computer-implemented method, comprising:

receiving, at a first local scheduler node in a distributed database system, a first fragment of an execution plan for a query, the first fragment of the execution plan received from a global scheduler node that partitioned the execution plan into the first fragment and the second fragment, the second fragment being sent to a second local scheduler node for execution, the first fragment of the execution plan including a first task and a second task, and the first local scheduler node executing the first fragment of the execution plan by at least tracking an execution state of the first task and the second task being performed by a first worker node associated with the first local scheduler node;

responding, by the first local scheduler node, to a first defect at the first worker node by at least assigning, to a second worker node associated with the first local scheduler node, the first task and the second task, the second worker node responding to the assigning by at least re-executing at least one of the first task and the second task in order to rebuild intermediate data that is lost due to the first defect at the first worker node;

responding, by a third local scheduler node in the distributed database system, to a second defect at the first local scheduler node by at least:

collecting, from at least one of the first worker node and the second worker node, a log indicating one or more tasks completed by the at least one of the first worker node and the second worker node prior to the second defect at the first local scheduler node;

determining, based at least on the log, that the at least one of the first worker node and the second worker node have completed the first task but not the second task; and continuing the executing the first fragment of the execution plan by at least tracking the execution state of the second task being performed by the at least one of the first worker node and the second worker node; and sending, to the second local scheduler node, a notification indicating a completion of the first fragment of the execution plan without the second local scheduler node having received the second fragment of the execution plan from the global scheduler node.

8. The method of claim 7, wherein the log further indicates that the at least one of the first worker node and the second worker node are in the process of completing the second task, and wherein the indication prevents the third local scheduler node from reassigning the second task to a third worker node.

9. The method of claim 7, further comprising:
receiving, at the global scheduler node, the query, the query requiring data stored at the first worker node and a third worker node associated with the second local scheduler node;
generating the execution plan for the query;
partitioning the execution plan into the first fragment and the second fragment; and
delegating the first fragment of the execution plan to the first local scheduler node and the second fragment of the execution plan to the second local scheduler node.

10. The method of claim 9, further comprising:
receiving, at the second local scheduler node, the notification from the third local scheduler node prior to receiving, from the global scheduler node, the second fragment of the execution plan.

11. The method of claim 7, wherein the third local scheduler node is configured to send, to the second local scheduler node, the notification in response to the at least one of the first worker node and the second worker node having completed executing the first fragment of the execution plan.

12. The method of claim 7, further comprising:
updating, by the at least one of the first worker node and the second worker node, the log upon completing the first task; and
reporting, to at least one of the first local scheduler node and the third local scheduler node, the completion of the first task.

13. A computer program product comprising a non-transitory machine-readable medium storing instructions that, when executed by at least one programmable processor, cause the at least one programmable processor to perform operations comprising:

receiving, at a first local scheduler node in a distributed database system, a first fragment of an execution plan for a query, the first fragment of the execution plan received from a global scheduler node that partitioned the execution plan into the first fragment and the second fragment, the second fragment being sent to a second local scheduler node for execution, the first fragment of the execution plan including a first task and a second task, and the first local scheduler node executing the first fragment of the execution plan by at least tracking an execution state of the first task and the second task being performed by a first worker node associated with the first local scheduler node;

responding, by the first local scheduler node, to a first defect at the first worker node by at least assigning, to a second worker node associated with the first local scheduler node, the first task and the second task, the second worker node responding to the assigning by at least re-executing at least one of the first task and the second task in order to rebuild intermediate data that is lost due to the first defect at the first worker node;

responding, by a third local scheduler node in the distributed database system, to a second defect at the first local scheduler node by at least:

collecting, from at least one of the first worker node and the second worker node, a log indicating one or more tasks completed by the at least one of the first worker node and the second worker node prior to the second defect at the first local scheduler node;

determining, based at least on the log, that the at least one of the first worker node and the second worker node have completed the first task but not the second task; and continuing the executing the first fragment of the execution plan by at least tracking the execution state of the second task being performed by the at least one of the first worker node and the second worker node; and sending, to the second local scheduler node, a notification indicating a completion of the first fragment of the execution plan without the second local scheduler node having received the second fragment of the execution plan from the global scheduler node.

* * * * *